United States Patent [19]

Kast

[11] Patent Number: 5,082,245
[45] Date of Patent: Jan. 21, 1992

[54] SPILL PROOF CHECK VALVE APPARATUS

[75] Inventor: Howard B. Kast, Fairfield, Ohio

[73] Assignee: General Electric Company, Cincinnati, Ohio

[21] Appl. No.: 482,575

[22] Filed: Feb. 21, 1990

[51] Int. Cl.⁵ .............................................. F16L 29/00
[52] U.S. Cl. ................................. 251/149.6; 137/327
[58] Field of Search ................ 251/149.6; 137/614, 137/614.04, 319, 327, 543.23

[56] References Cited

U.S. PATENT DOCUMENTS

| | | | |
|---|---|---|---|
| 3,575,221 | 4/1971 | Mochizuki et al. | 251/149.6 X |
| 3,802,457 | 4/1974 | Wurzburger | 137/327 |
| 3,851,666 | 12/1974 | Hammond | 251/149.6 X |

FOREIGN PATENT DOCUMENTS

| | | |
|---|---|---|
| 943057 | 11/1983 | United Kingdom . |
| 1444574 | 8/1976 | United Kingdom . |
| 2161235 | 1/1986 | United Kingdom . |

Primary Examiner—John C. Fox
Attorney, Agent, or Firm—Jerome C. Squillaro

[57] ABSTRACT

A check valve apparatus is provided for use in connecting two fluid passageways, such as between which have multiple fluid passageways. The check valve manifolds and servovalves apparatus includes a poppet seal and a spring which engages and biases the poppet outward in sealing engagement with a portion of the wall surrounding the fluid passageway entrance and the entrance is effective for receiving an extension of the other fluid passage so that the extension engages and biases the poppet open. Mounted on the poppet is a means for sealing and retaining said poppet within the cavity which in the preferred mode is an elastomeric O ring restrainedly mounted within an annular channel circumscribing the poppet. One embodiment contemplates servovalve including a casing having extensions which comprise a filter.

20 Claims, 4 Drawing Sheets

SPILL PROOF CHECK VALVE APPARATUS

BACKGROUND OF THE INVENTION

The invention relates to fluid connections which help minimize spillage during connect and disconnect. In particular, the invention relates a poppet type check valve in a hydraulic fluid connection.

Spillage is an undesirable occurrence during assembly and disassembly of hydraulic systems particularly where the hydraulic fluid is not drained out. Such a problem exists in the case of aircraft gas turbine engines where the hydraulic fluid is fuel and portions of the hydraulic system must be disconnected for overhaul, repair, replacement and various other reasons. A particular problem which the present invention addresses occurs where hydraulic manifolds are mounted to the gas turbine engine and hydraulic accessories such as servovalves are mounted to the manifold. The manifold directs hydraulic fluids to other hydraulic accessories such as actuators and provides for pressurized hydraulic fluid to be supplied from and returned to a hydraulic pump and for the controlled fluid to be supplied to and returned from the actuators. The servovalve controls the fluid so that it provides the pressurized fluid as scheduled. Removing the servovalve from beneath the manifold can be a messy job even if the system has been drained since residual amounts of hydraulic fluid often remains in the manifold tubes leading to it. Since the fluid may be jet fuel the spillage can be dangerous as well. The manifold servovalve assembly is designed to facilitate the servicing of the servovalve and of course this is always a desirable attribute of any aircraft engine apparatus as is low cost design and service features.

OBJECTS OF THE INVENTION

Accordingly it is an object of the invention to provide a fluid connection that reduces spillage.

Another object of the invention to provide a fluid connection that is easily serviced and is inexpensive to produce.

Another object of the invention to provide a manifold having multiple fluid connections that reduce spillage and are easily serviced and inexpensive to produce.

Another object of the invention to provide a servovalve and manifold assembly having multiple fluid connections that reduce spillage and are easily serviced and inexpensive to produce.

DISCLOSURE OF INVENTION

Inserted in a cavity is a check valve apparatus that includes a poppet seal and a spring which engages and biases the poppet outward in sealing engagement with a portion of wall surrounding the entrance of the cavity and mounted on the poppet is a means for sealing and retaining said poppet within the cavity. In the preferred mode the sealing and retaining means includes an elastomeric O ring restrainedly mounted on the poppet within an annular channel circumscribing the poppet. In the preferred embodiment of the invention a servovalve and manifold assembly includes the check valve apparatus. The manifold is connected to a servovalve casing and a first plurality of fluid passages is formed in the manifold and a matching second plurality of fluid passages is formed in the casing. Extensions extending out from the casing into the cavity connect first fluid passages to respective second fluid passages and engage and hold open the poppet and the extension may comprise a filter.

The invention eliminates or greatly reduces the spillage which occurs during assembly and disassembly of fluid connections particularly of manifolded multiple hydraulic fluid connections. This advantage is further enhanced when the fluid is jet fuel for it reduces the possibility of fires. The invention adds little to the thickness of the manifold because it is installed through the existing port rather than a separate opening in the top surface, as in the prior art, or to its cost, and the check valve means is easily replaced and relatively inexpensive to produce.

BRIEF DESCRIPTION OF DRAWINGS

The novel features believed to be characteristic of the invention are set forth and differentiated in the claims. The invention, in accordance with referred, exemplary embodiments, together with further objects and advantages thereof, is more particularly described in the following detailed description taken in conjunction with the accompanying drawing in which:

MODES FOR CARRYING OUT THE INVENTION

Figure 1:
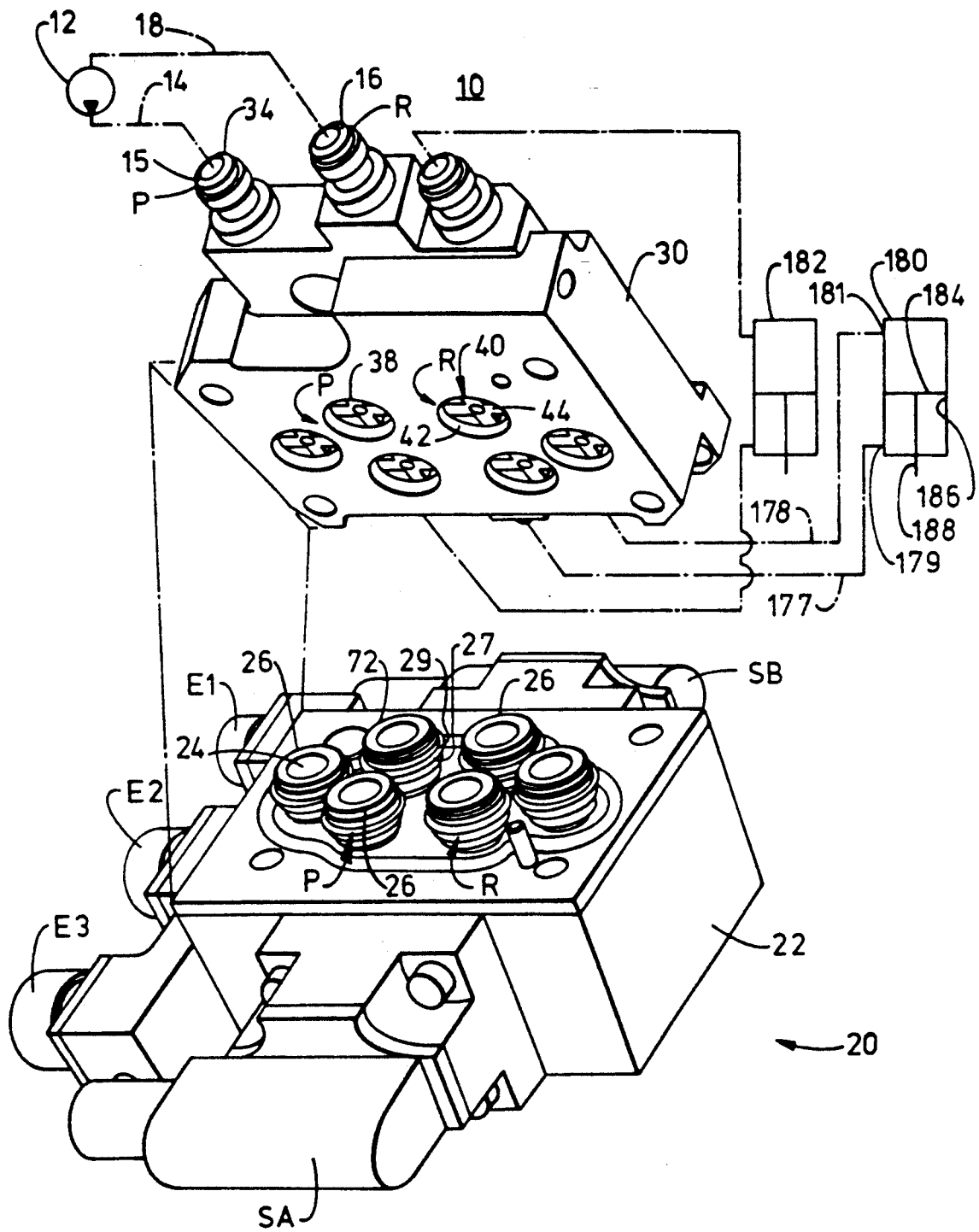
FIG. 1 is an exploded view of the manifold containing the check valve apparatus and servo valve assembly in accordance with one embodiment of the present invention.

FIG. 1 generally shows a servo valve manifold assembly 10 which is particularly useful for use on aircraft gas turbine engines not shown. Servo valve manifold assembly 10 includes a manifold 30 on top of a servo valve assembly 20. This particular arrangement is suited for use on aircraft gas turbines where the manifold is bolted, bracketed, or otherwise mounted to the gas turbine engine. Manifold 30 generally includes a first plurality of fluid passageways 23, shown in FIG. 2, which have a manifold entrance 38 at one end, along the mating interface between the manifold and servovalve assembly 20, and a manifold port 34 at the other end for hydraulic flow connection to another part of the hydraulic system. Manifold 30 is adapted to receive pressurized hydraulic fluid, which in this particular case is jet fuel, from hydraulic pump 12 through pump pressure line 14 into port 15. It then distributes the fluid to servo valve assembly 20 through one of the first plurality of fluid passageways 23 which includes at one end the manifold entrance 38 which is labeled P in FIG. 1 and returns the hydraulic fluid through another manifold entrance 38 labeled R from which it is conducted to manifold return port 16 through return line 18 back to hydraulic pump 12. Other manifold entrances 38 receive fluid from servo valve assembly 20 to be sent to one of the two servo pistons shown as 180 and 182 respectively. Servo valve assembly 20 includes two servo's, SA and SB, and is electrically controlled and operated by way of three electrical connectors E1, E2, and E3.

Figure 5:
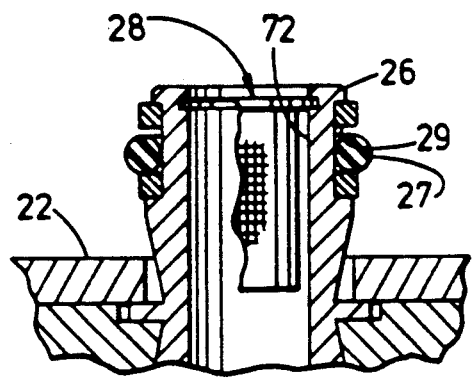
FIG. 5 is a partial cross-sectional view taken along 5—5 of FIG. 4 of the servo valve assembly fluid passageway and extension of the casing in FIG. 1.

Servo valve assembly 20 including servo's SA and SB, as shown in FIG. 1, comprises a casing 22 which generally includes extensions 26 which are continuations of a second plurality of fluid passages 72. Casing ports 24 include extensions 26 which provide for a good fluid connection between fluid passages 72 and fluid passages 23. Extension 26, shown in more specific detail in FIG. 5, includes an extension seal 27 circumscribing extension 26 mounted in a groove 29 and in the preferred embodiment, comprising an elastomeric O ring. Extension 26, in the preferred embodiment, also includes an internally mounted screen, 28. Extension seal 27 engages a manifold bore 60, shown in FIG. 6, through manifold entrance 38. Extension 26 also engages poppet 44 and holds it open while the manifold and servovalve assembly are connected. When the servovalve assembly is disconnected and the extension is removed, the poppet begins to close and is finally closed when the elastomeric O ring, 51, which forms the poppet seal engages the shouldered wall 61 at its chamfer 47.

First and second servo pistons, shown generally at 180 and 182 respectively, are generally the same and comprise a piston 184 disposed for translation within a bore 186 from which extends a connecting rod 188 in integral connection with the piston 184. The head side of the piston 184 receives an inlet flow of pressurized liquid from an inlet port 181 which communicates with a port 114, shown in FIG. 2, in manifold 30 by way of an interconnecting conduit 178. In like manner, the connecting rod side of piston 184 receives an inlet flow of pressurized liquid from an inlet port 179 which communicates with a port 112, shown in FIG. 2, in manifold 30 by way of an interconnecting conduit 177.

Figure 2:
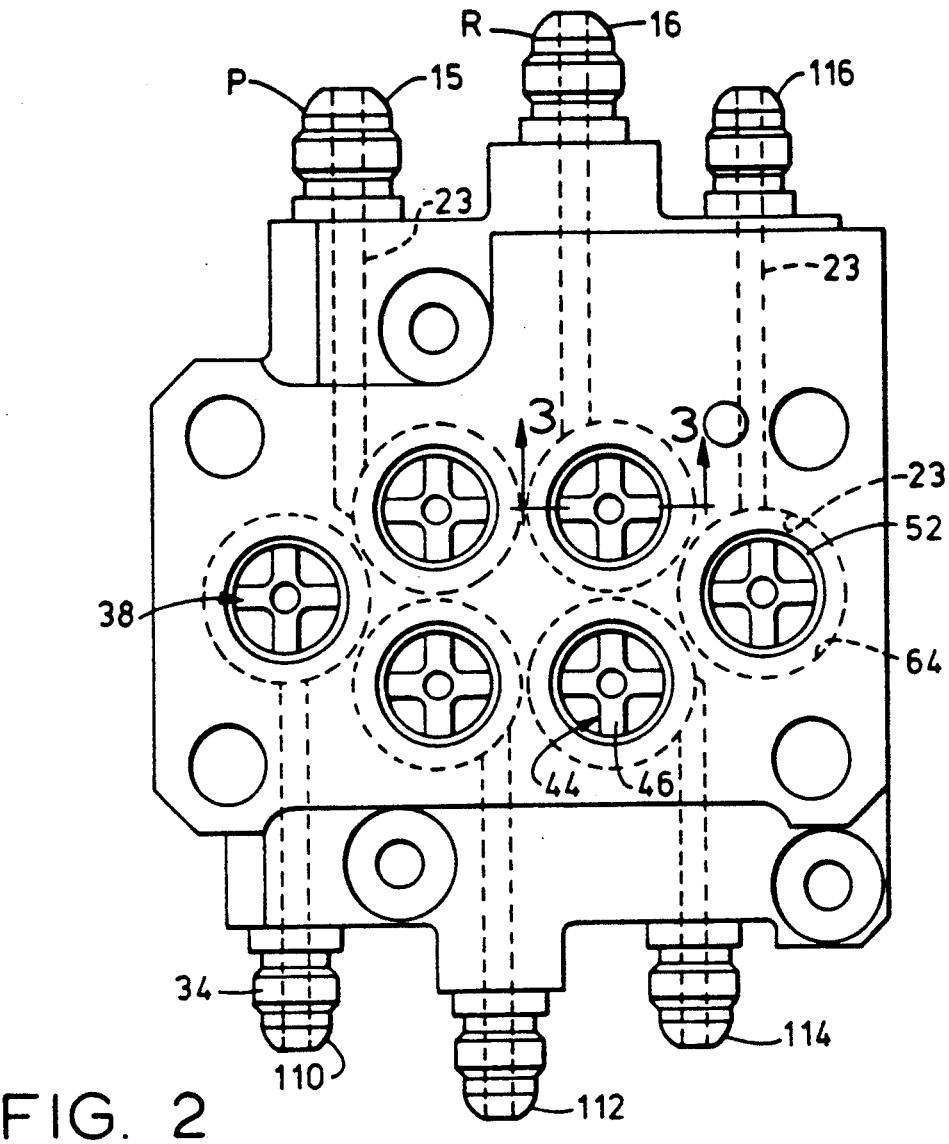
FIG. 2 is a bottom view of the manifold including the check valve apparatus.
Figure 3:
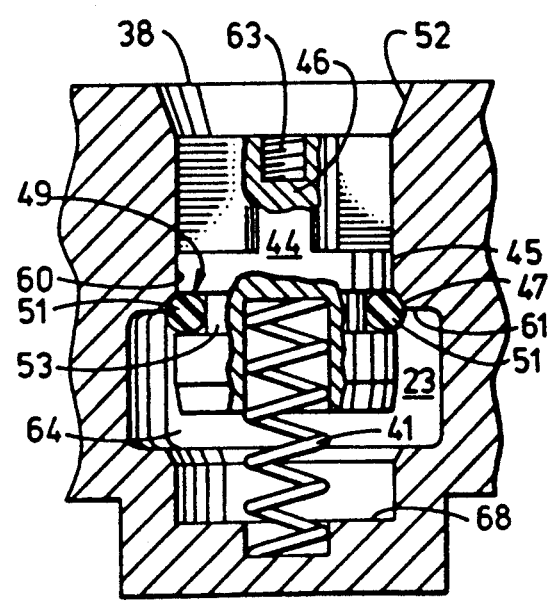
FIG. 3 is a partial cross-sectional view taken along 3—3 of FIG. 2 of a portion of the manifold including the check valve apparatus of the present invention.
Figure 4:
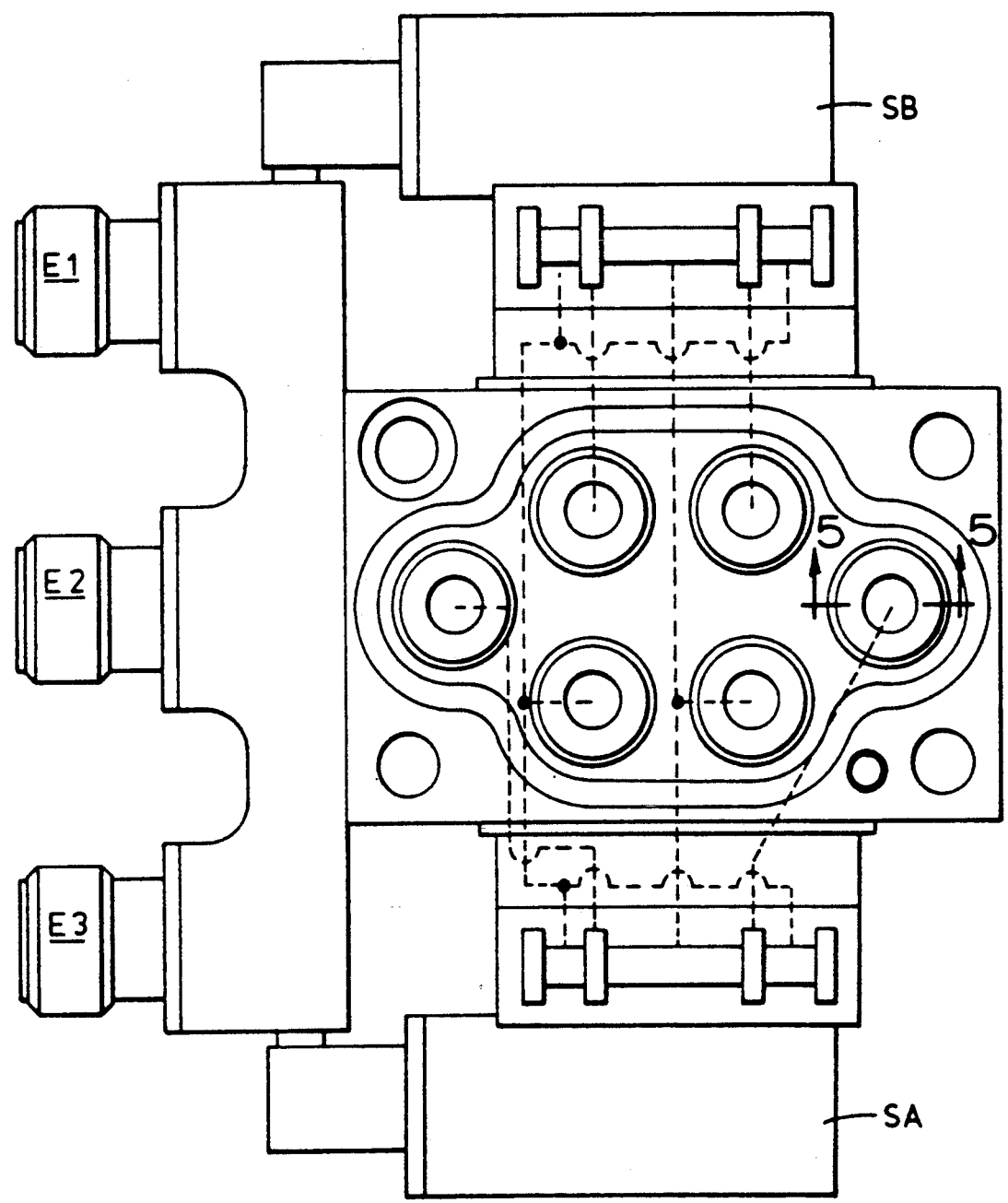
FIG. 4 is a top view of the servo valve assembly showing the entrances of the various fluid passages that are to be connected to the manifold of FIG. 2.

FIG. 2 depicts a more detailed view of the passageways within manifold 30 which mates with servo valve assembly 20 having varying fluid passageways as shown in FIG. 4. Referring to FIG. 2., each passageway 23 has a port which leads to either the hydraulic pump 12 and back again or to one of the two servo pistons shown as 180 and 182. Manifold entrances 38 then provide a connection for the various ports through passageways 23 to supply or receive fluid which is controlled by servo valve assembly 20. Check valve apparatus 40, as shown in FIG. 3, is disposed within a manifold entrance 38 which has a flared opening 52 leading to a bore 60 which forms cavity 64 having a back wall 68. Poppet 44 is disposed within cavity 64 and comprises a sealing portion 45 and a cross shaped guide 46. A spring 41 is braced against back wall 68 and engages and biases the poppet sealing portion 45 up against the chamfer 47 of shouldered wall 61 of manifold entrance 38. A poppet sealing and retaining means 49 both seals and retains the poppet 44 within the cavity 64 and in the preferred embodiment comprises an elastomeric O ring 51 in an annular channel 53. The O ring is sized so that in its undeformed state its outer diameter is greater than the inside diameter of bore 60 but may be deformed with pressure to slide through bore 60 for insertion and removal. A poppet removal means 63 comprises a threaded hole into which a screw tipped device may be connected to the poppet for removal.

Figure 6:
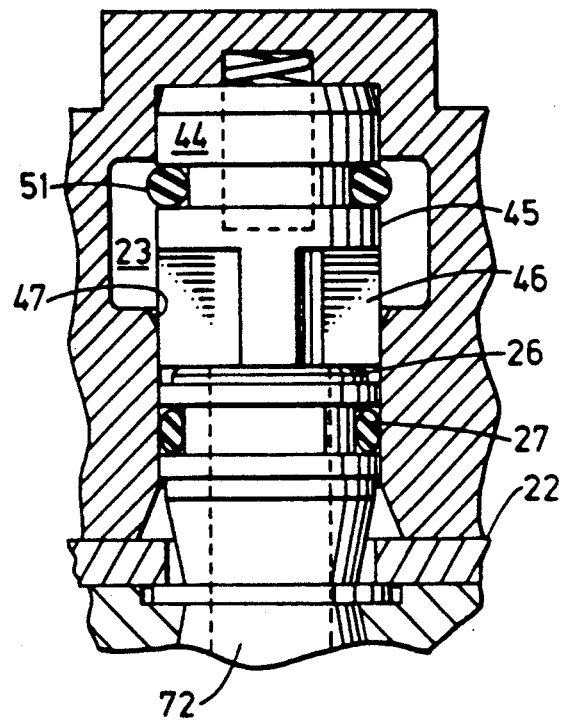
FIG. 6 is a cross-sectional view which depicts the check valve apparatus, shown inverted in FIG. 3, mated to the servo valve assembly casing extension shown in FIG. 5.

During operation, as shown in FIG. 6, extension 26 holds open the poppet and allows the hydraulic fluid to pass between the first and second passageways. During disassembly the extension 26 is withdrawn and extension seal, 27 which is located on the extension, maintains a fluid tight seal with the bore 60 of the cavity until O ring seal 51 of poppet 44 engages the bore of the cavity 64 effectively closing off first plurality of fluid passageways and since the servovalve assembly is upside down very little if any fluid should spill out.

The present invention has been described in an illustrative manner. It is to be understood that the terminology which has been used is intended to be in the nature of words of description rather than of limitation.

Obviously, many modifications and variations of the present invention are possible in light of the above teachings. It is, therefore, to be understood that within the scope of the appended claims, the present invention may be practiced otherwise than as specifically described.

I claim:

1. A check valve apparatus for use in a fluid passageway cavity which is part of an entrance with a hole having a shouldered wall, said check valve comprising:
    a poppet seal,
    a spring engaging said poppet for biasing said poppet outward towards the hole, and
    entrance insertable means for sealing and retaining said poppet within said cavity, wherein said poppet seal, spring, and sealing and retaining means are installed by insertion through said hole.

2. An apparatus as claimed in claim 1 wherein said poppet includes a removal means.

3. An apparatus as claimed in claim 2 wherein said sealing and retaining means includes an elastomeric O ring restrainedly mounted on said poppet.

4. An apparatus as claimed in claim 3 wherein said elastomeric O ring is mounted within an annular channel circumscribing said poppet.

5. An apparatus as claimed in claim 4 wherein said a removal means comprises a tapped hole in the center of said poppet facing out of the entrance.

6. A fluid connecting apparatus to connect fluid passages across a mating interface, said connecting apparatus comprising:
    a first element on a first side of the interface having a first fluid pathway and an extension of said first fluid pathway across the interface;
    a second element on a second side of the interface having a second fluid pathway effective for accepting said extension; and
    a check valve means comprising a poppet disposed in a cavity of an entrance to said second fluid pathway wherein said entrance includes a hole having a shouldered wall, a spring engaging said poppet for biasing said poppet outward towards the hole, and entrance insertable means for sealing and retaining said poppet within said cavity, wherein said poppet seal, spring, and sealing and retaining means are installed by insertion through said hole, said sealing and retaining means operatively associated with said valve means.

7. An apparatus as claimed in claim 6 wherein said sealing and retaining means includes an elastomeric O ring restrainingly mounted on said poppet.

8. An apparatus as claimed in claim 7 wherein said elastomeric O ring is mounted within an annular channel circumscribing said poppet.

9. An apparatus as claimed in claim 8 wherein said extension includes an extension sealing means to provide fluid sealing of said extension within said cavity.

10. An apparatus as claimed in claim 9 wherein said extension sealing means comprises a second elastomeric O ring mounted within a groove circumscribing said extension and positioned on said extension so as to provide fluid sealing of said extension within said cavity at least to the extent said poppet is in the open position.

11. An apparatus as claimed in claim 10 further comprises a removal means comprising a tapped hole in the center of said poppet facing out of the entrance.

12. A fluid manifold assembly comprising:
   a manifold connected to a casing on a first side of a mating interface;
   a first plurality of fluid passages formed in said manifold extending to said interface;
   a second plurality of fluid passages formed in said casing; extensions extending out from said manifold across said interface for connecting said first fluid passages to respective said second fluid passages across said interface;
   said second fluid passages having entrances for receiving said extensions, each of said entrances comprising a cavity including a hole having a shouldered wall; and
   a check valve means inserted in said cavity comprising a poppet seal disposed in said cavity, a spring engaging said poppet for biasing said poppet outward towards and in sealing relationship with said shouldered wall, and entrance insertable means for sealing and retaining said poppet within said cavity, wherein said poppet seal, spring, and sealing and retaining means are installed by insertion through said hole.

13. A manifold assembly as claimed in claim 12 wherein said sealing and retaining means includes an elastomeric O ring restrainedly mounted on said poppet.

14. A manifold assembly as claimed in claim 13 wherein said elastomeric O ring is mounted within an annular channel circumscribing said poppet.

15. A manifold assembly as claimed in claim 14 wherein said extension includes an extension sealing means to provide fluid sealing of said extension within said cavity.

16. A manifold assembly as claimed in claim 15 wherein said extension sealing means comprises a second elastomeric O ring mounted within a groove circumscribing said extension and positioned on said extension so as to provide fluid sealing of said extension within said cavity at least to the extent said poppet is in the open position.

17. A manifold assembly as claimed in claim 16 wherein said extension is a filter.

18. An apparatus as claimed in claim 14 further comprises a removal means comprising a tapped hole in the center of said poppet facing out of the entrance.

19. An apparatus as claimed in claim 18 wherein said extension includes a screen filter.

20. A check valve apparatus for use in a fluid passageway cavity which is part of an entrance with a hole having a shouldered wall, said check valve comprising:
   a poppet seal including removal means comprising a tapped hole in the center of said poppet facing out of the entrance,
   a spring engaging said poppet for biasing said poppet outward towards the hole, and
   a means for sealing and retaining said poppet within said cavity, wherein said sealing and retaining means includes an elastomeric O-ring restrainedly mounted within an annular channel circumscribing said poppet.

* * * * *